United States Patent
Taylor et al.

(10) Patent No.: US 9,967,749 B2
(45) Date of Patent: *May 8, 2018

(54) SECURE NEAR FIELD COMMUNICATION SERVER INFORMATION HANDLING SYSTEM SUPPORT

(71) Applicant: Dell Products L.P., Round Rock, TX (US)

(72) Inventors: Travis Taylor, Hutto, TX (US); Syed S. Ahmed, Round Rock, TX (US); John R. Palmer, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/038,128

(22) Filed: Sep. 26, 2013

(65) Prior Publication Data

US 2015/0089221 A1 Mar. 26, 2015

(51) Int. Cl.
*G06F 21/35* (2013.01)
*H04W 12/08* (2009.01)
*H04L 9/32* (2006.01)

(52) U.S. Cl.
CPC .......... *H04W 12/08* (2013.01); *G06F 21/35* (2013.01); *H04L 9/3236* (2013.01)

(58) Field of Classification Search
CPC .. H04W 12/06; H04W 12/08; H04L 63/0853; H04L 9/3234; G06F 21/34; G06F 21/35; G06F 21/44
See application file for complete search history.

(56) References Cited

U.S. PATENT DOCUMENTS

| 8,321,922 | B1* | 11/2012 | Lo et al. ........................ 726/7 |
| 8,863,247 | B2 | 10/2014 | Lee et al. |
| 2002/0010768 | A1 | 1/2002 | Marks et al. |
| 2005/0022025 | A1 | 1/2005 | Hug |
| 2005/0242925 | A1* | 11/2005 | Zaretsky ............. G06F 11/0706 340/10.1 |
| 2007/0039902 | A1 | 2/2007 | Lawrence et al. |
| 2007/0204332 | A1* | 8/2007 | Pan .................................. 726/5 |
| 2008/0126627 | A1 | 5/2008 | Chandrasekhar et al. |
| 2010/0277866 | A1* | 11/2010 | Chen ........................ 361/679.57 |
| 2011/0311052 | A1 | 12/2011 | Myers et al. |

(Continued)

FOREIGN PATENT DOCUMENTS

EP 2650458 A1 10/2013

*Primary Examiner* — Eleni A Shiferaw
*Assistant Examiner* — Alexander R Lapian
(74) *Attorney, Agent, or Firm* — Terrile, Cannatti, Chambers & Holland, LLP; Robert W. Holland

(57) ABSTRACT

Secure NFC interactions with a server information handling system management controller, such as a baseboard management controller, are supported with an NFC application running on a mobile information handling system. A private key is applied by the mobile application to create an application hash that a baseboard management controller verifies to authorize access by the NFC application. The private key encrypts a user name and password so that the baseboard management controller decrypts the user credentials to look up access privileges in a security database. If user privileges include access to components, the baseboard management controller automatically actuates locks to provide access.

19 Claims, 9 Drawing Sheets

(56) References Cited

U.S. PATENT DOCUMENTS

| | | | |
|---|---|---|---|
| 2012/0054832 A1* | 3/2012 | Ghosh et al. | 726/4 |
| 2012/0087493 A1* | 4/2012 | Chidambaram et al. | 380/44 |
| 2012/0106738 A1* | 5/2012 | Belenkiy | H04L 9/0872 380/270 |
| 2012/0144203 A1* | 6/2012 | Albisu | 713/184 |
| 2013/0019281 A1* | 1/2013 | Jacobs | G06F 21/575 726/4 |
| 2013/0238785 A1* | 9/2013 | Hawk et al. | 709/224 |
| 2014/0047567 A1* | 2/2014 | Haselsteiner et al. | 726/34 |
| 2015/0024710 A1* | 1/2015 | Becker | H04W 12/06 455/411 |

* cited by examiner

SECURE NEAR FIELD COMMUNICATION SERVER INFORMATION HANDLING SYSTEM SUPPORT

CROSS REFERENCE TO RELATED APPLICATIONS

U.S. patent application Ser. No. 14/038,072, entitled "Secure Near Field Communication Server Information Handling System Lock" by inventors Travis Taylor, Syed S. Ahmed, and John R. Palmer, filed Sep. 26, 2013, describes exemplary methods and systems and is incorporated by reference in its entirety.

BACKGROUND OF THE INVENTION

Field of the Invention

The present invention relates in general to the field of information handling system server management, and more particularly to secure near field communication server information handling system support.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems are often concentrated in data centers that provide power and cooling infrastructure. An enterprise will often support email, data storage and ecommerce operations in one or more data centers in an attempt to secure information and business operations. The server information handling systems are typically maintained by an information technology (IT) team that manages systems and stored information through remote and local operations. For example, server information handling systems typically include a baseboard management controller (BMC) having an out-of-band network interface so that IT professionals have access to physical components of a server from a remote location. A BMC will typically allow remote start-up, power down and configuration of a server through a secure network interface separate from the enterprise network interface supported by the server. Although a BMC out-of-band network interface provides remote access for many server maintenance tasks, some tasks do require a physical presence at an information handling system. For example, a failure of a physical component within a server, such as a storage drive, often results in assignment of an individual to open the server and replace the failed component.

Server information handling systems often manage sensitive enterprise information and operations. To protect against data loss, data centers typically have redundancy and security systems in place. Redundancy systems store back-up copies of information in case a primary copy is lost and provide back-up cooling and power resources in case primary resources become degraded or unavailable. For example, server information handling systems often have RAID storage that maintains redundant copies of information in case a storage device fails. As another example, server information handling systems often have multiple power supplies and cooling fans so that the system can continue to operate in a degraded state if a power supply or cooling fan fails. Security systems protect against unauthorized and malicious acts that threaten server operations and data integrity. For example, data centers typically use password-secured access to information and systems to prevent unauthorized actions, such as an Active Directory (AD) system supported by Microsoft or various implementations of a lightweight directory access protocol (LDAP) system. Generally, such security systems allow users to access information based upon a level of access granted by reference to the user's credentials. For instance, most end users have access limited to their e-mail accounts and documents, while some users have greater access to monitor resource use without authority to alter data, and some users have access to control data of others. As an example, in a data center physical location, IT professionals often have access to administrative functions to manage server operations but lack access to information managed by the servers. Higher level administrators, in contrast, have access to information managed by servers, including authority to assign access levels to other users. Often, complex relationships are defined within an enterprise to closely control who has access at a system level versus access to information stored on server systems.

Recent trends in data management have further complicated efforts towards data security. One example of this is that enterprises have moved towards cloud-based services as an alternative to owning and maintaining their own server information handling system and storage resources. A data center that provides cloud-based services might support competing enterprises who share the same physical processing resources. For example, virtual machines associated with separate enterprises may run on the same server information handling system and share the same hard disk drive. Although data centers typically have tight physical security measures to prevent physical access to server and storage resources, the use of cloud computing effectively precludes restriction of physical access to server and storage resources based upon the end user who is using the resources. This difficulty is further multiplied where the server resources include wireless networking assets that support wireless communication within a data center, such as through a wireless local area network or even a Bluetooth connection that allows the use of wireless keyboards. For this and other security concerns, data centers often will not install server information handling systems that include wireless networking resources. However, in some instances, data centers will use near field communication (NFC) devices that allow IT administrators to wirelessly interface with server BMCs at very close range, such as with an NFC device integrated in a smartphone, tablet or other type of portable information handling system. Because of the short range involved with NFC devices, data centers generally assume that an individual who accesses a BMC with NFC is authorized to have physical access to the system.

SUMMARY OF THE INVENTION

Therefore, a need has arisen for a system and method which supports secure near field communication server information handling system support.

In accordance with the present invention, a system and method are provided which substantially reduce the disadvantages and problems associated with previous methods and systems for accessing an information handling system with near field communication devices. Secure NFC transfers between a mobile information handling system and a server information handling system are coordinated with access privileges defined for a data center, such as LDAP based access privileges. A mobile system runs an application that authenticates itself with a baseboard management controller and, after authentication, provides user name and password credentials that define user access privileges. The access privileges may include physical access to components of the server information handling system provided by locks associated with the components and controlled by the baseboard management controller.

More specifically, a server information handling system has plural components disposed in a chassis to process information, such as one or more processors, memory, network interface cards, persistent storage devices, and a baseboard management controller (BMC) that manages operation of the server, such as with remote starts and shut downs. An NFC device interfaces with the BMC, such as through an intermediary microprocessor. An external NFC device, such as in a smartphone, interfaces with the BMC NFC device using NFC protocol communications with security provided by a private key. An NFC application running on the smartphone applies the private key to generate an application hash. The BMC receives the application hash and authenticates the NFC application as authorized to perform NFC communications before allowing additional NFC communications. Once the BMC authenticates the NFC application, the NFC application sends the BMC a user credential hash having a user name and password encrypted with the private key. The BMC looks up the access privileges associated with the user name and password, such in a local security database or network-based LDAP or AD security database. The BMC permits NFC communications based on the user's privileges and disallows non-privileged accesses. In one embodiment, the privileges include NFC initiated actuation by the BMC of locks that control physical access to the server information handling system, such as a bezel lock or a lock to predetermined components, such as storage devices, power supplies and cooling fans.

The present invention provides a number of important technical advantages. One example of an important technical advantage is that a data center controls access to server information handling system by NFC devices with high granularity and privileges consistent with existing security databases. For instance, within a data center, users have access to server BMCs based upon administrator defined privileges so that tight controls may be placed upon end user access and monitored with BMC logs. Even within a particular server, user access may be defined so that different enterprises can share a physical resource while keeping access restricted to each enterprise's data. For instance, locks on storage devices within a server may allow an enterprise information technology administrator to remove only those storage devices that store his enterprise's information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Secure NFC server information handling system management provides secure physical and logical access proximate the physical location of a server information handling system to improve system and information management in a datacenter environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
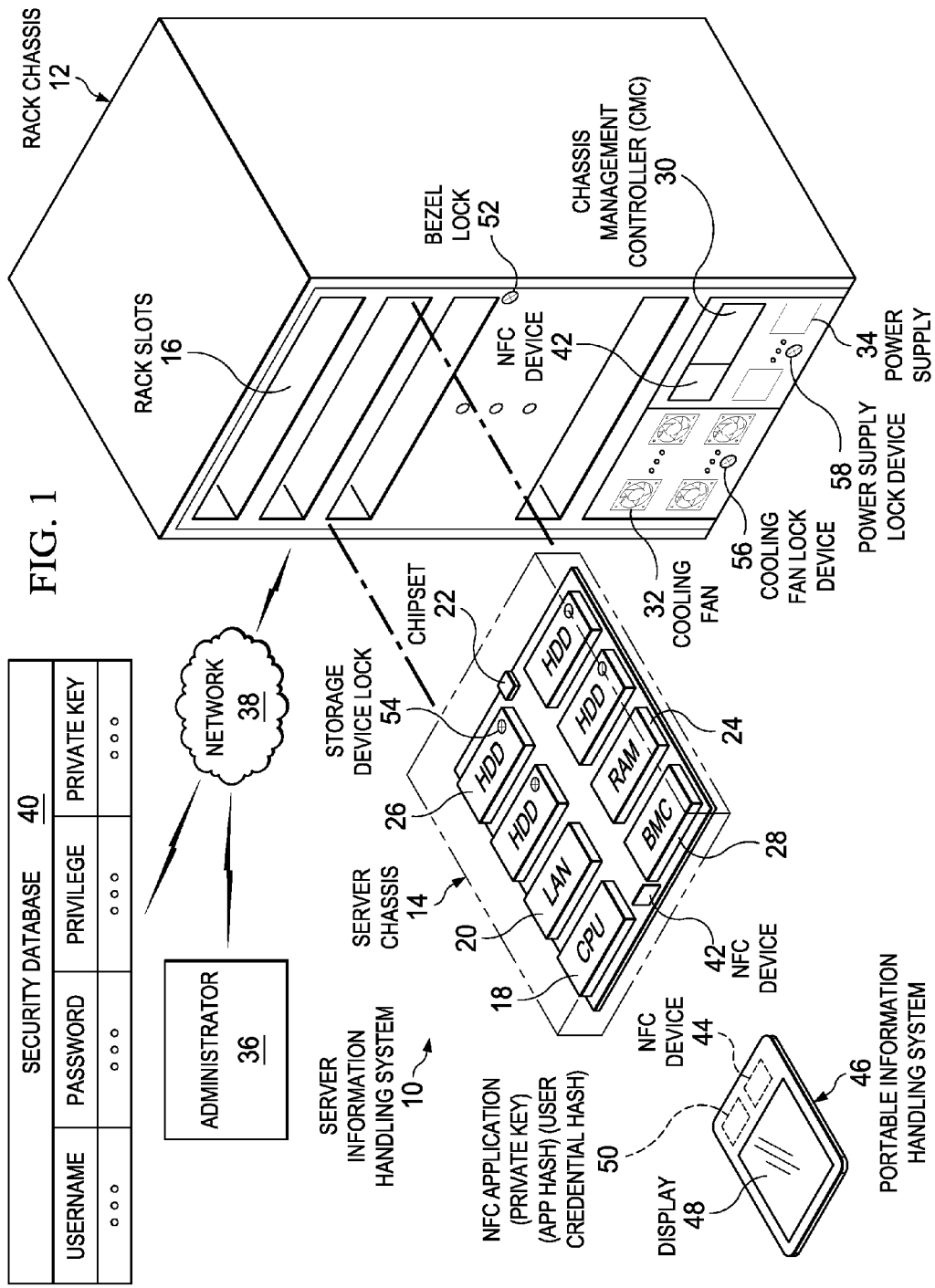
FIG. 1 depicts a block diagram of server information handling systems supported by secure NFC management.

Referring now to FIG. 1, a block diagram depicts server information handling systems 10 supported by secure NFC management. In the example embodiment, a rack chassis 12 supports and manages infrastructure for plural information handling system server chassis 14 disposed in slots 16. Each server information handling system 10 has one or more central processing units (CPUs) 18 that process information, such as requests from clients received through one or more local area network interfaces 20, such as Ethernet network interface cards (NICs). A chipset 22 includes processing resources and firmware to support operation of CPUs 18, such as BIOS that manages interactions between components on a hardware level. Non-persistent memory, such as RAM 24, stores information for processing by CPUs 18, and persistent memory, such as hard disk or solid state drives 26, store information when the server is powered down. A baseboard management controller (BMC) 28 integrated in server chassis 14 provides management of the components of server information handling system 10, such as a remote power up and power down of CPU 18 with out-of-band network communications, BIOS and other firmware re-flashes, and allocation of infrastructure resources, such as those allocated by a chassis management controller (CMC) 30. For instance, rack chassis 12 has cooling fans 32 and power supplies 34 that provide cooling air flow and power to slots 16 under the management of CMC 34 and coordinated through BMCs 28. In some instances, rack chassis 12 is referred to as a server information handling system that has server modules disposed in slots 16, such as with blade servers that have plural blades.

In operation, an administrator 36 interacts with server information handling systems 10 through a network 38 based upon access privileges defined in a security database 40, such as an active directory or other LDAP-based security database. Typically, user names protected by a password are assigned privileges in security database 40 that define the types of accesses allowed to the user associated with the user name. Access privileges vary based on the types of access that a user needs to perform enterprise functions. For example, access may be defined according to: the type of information stored and processed by server information handling systems, such as documents or emails; the type of application running on a system, such as a virtual machine; the administrative functions of a system, such as for a remote startup, power down or firmware re-flash, etc. . . . . For instance, an administrator 36 who signs into a server information handling system BMC 28 with access privileges for administrative functions may have authority to re-boot a server information handling system 10 with a command to BMC 28, but lack authority to access any information stored on hard disk drives 26 of the server information handling system 10. In another example, an administrator may have physical access privileges to change some of the storage devices 26 of an information handling system but not others. Fine granularities of access privileges are sometimes used in data centers that support cloud computing since, for instance, different storage devices of the same server could contain confidential information of different enterprises or individuals.

In the example embodiment depicted by FIG. 1, a near field communication (NFC) device 42 is integrated in each server information handling system 10 and interfaced with the BMC 28 of the server information handling system 10. A portable information handling system 46, such as a smartphone, includes a NFC device 44 that communicates with NFC device 42. A display 48 of portable information handling system 46 presents user interfaces generated by an NFC application 50 running on portable information handling system 46 so that an end user communicates through the interfaces with BMC 28 through NFC devices 42 and 44. A similar NFC device 42 supports communication between NFC application 50 and CMC 30. NFC application 50 permits an end user to interact with BMC 28 to perform management functions similar to those supported by network communications with BMC 28 from administrator 36. For instance, NFC application 50 reads information from BMC 28, writes information and commands to BMC 28 and commands actuation of devices controlled by BMC 28, such as electromechanical locks that secure components, including a bezel lock 52 that secures a server chassis 14 to rack chassis 12, storage device locks 54 that secure storage devices to server chassis 14, cooling fan locks 56 that secure cooling fans to rack chassis 12 and power supply locks 58 that secure power supplies to rack chassis 12.

In order to secure NFC information transfers and ensure that an end user does not exceed allowed privileges, NFC application 50 and BMC 28 cooperate to apply appropriate access privileges for an end user as determined from security database 40. Security database 40 includes a private key assigned to a user name and an NFC application. NFC application 50 obtains the private key, such as by an end user input, at display 48 or a download from security database 40. NFC application 50 applies the private key to generate an application hash that establishes the authenticity of the application for use in accessing BMC 28. In one embodiment, the application hash is unique to an application, such as an application used by a specific enterprise. In an alternative embodiment, the application hash is unique to one individual, such as by having a unique private key for each individual or by applying the private key to a phone number or unique device identifier of a smartphone. In either case, unless NFC application 50 provides an authentic application hash, BMC 28 will not allow any additional communications by NFC devices. Once NFC application 50 authenticates with an application hash, a user credential hash is provided from the NFC application 50 to BMC 28. The NFC application applies the private key to a user name and password of the end user so that the user name and password are encrypted in the user credential hash sent to BMC 28. BMC 28 decrypts the user credential hash, or alternatively, sends the user credential hash to security database 40 to decrypt. Once the user name and password are extracted from the user credential hash, BMC 28 retrieves privileges for the user name and password from security database 40 and allows access to components based upon the privileges. For instance, bezel lock 52 might unlock automatically in response to NFC commands to BMC 28 while storage device locks remain secure. As another example, a cooling fan lock might automatically unlock due to a temporary privilege granted to the user name to change that one cooling fan 32, while other locks remain secure and no other access is allowed by the end user.

Figure 2:
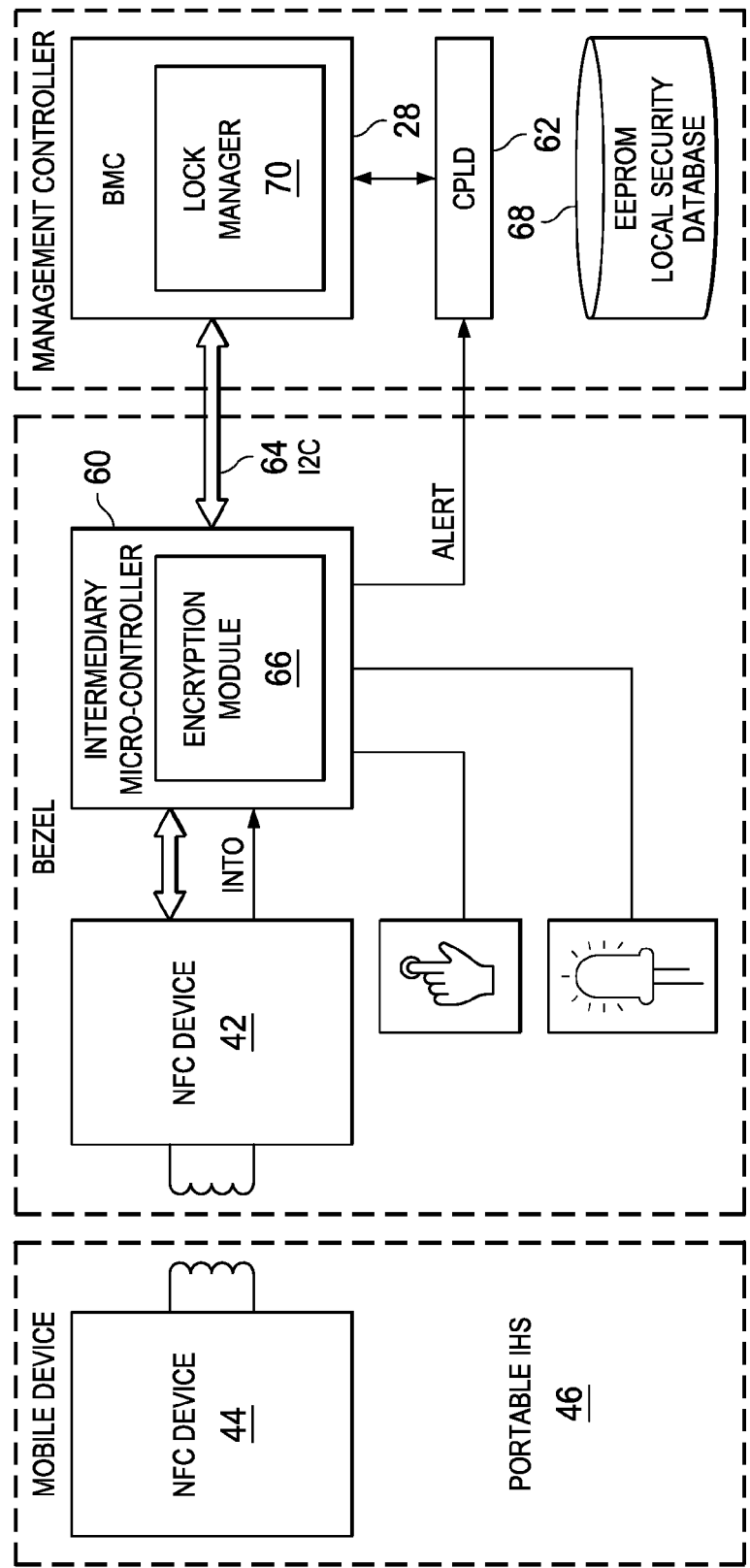
FIG. 2 depicts a block diagram of a system for secure NFC management supported through an intermediary device and BMC.

Referring now to FIG. 2, a block diagram depicts a system for secure NFC management supported through an intermediary device 60 and BMC 28. In one example embodiment, NFC device 42 and intermediary device 60 are integrated in a server bezel proximate a locking device that secures a server to a rack. Intermediary device 60 is a microcontroller that interfaces directly with NFC device 42 so that NFC interactions with the BMC are managed in a more effective manner. For instance, NFC protocol, security and communication management tasks are performed in part by microcontroller 60 so that BMC 28 has more processing cycles to perform other management tasks. Microcontroller 60 has the NFC stack embedded and is protocol aware so that information received from an external NFC device 44 is transformed into a protocol or format more typically handled by BMC 28, such as I2C. In an alternate embodiment, microcontroller 60 does not maintain the NFC stack but rather acts as a supporting processor or offloader for BMC 28, which maintains the NFC stack. Microcontroller 60 issues an interrupt to a CPLD device 62 interfaced with BMC 28 so that BMC 28 can retrieve information from microcontroller 60 through an I2C bus when BMC 28 is able to handle the task. An encryption module 66, such as firmware running on microcontroller 60 or circuits embedded in microcontroller 60, manages security actions, such as the encryption and decryption of the application hash and user credential hash provided by NFC device 46. In alternative embodiments, encryption module 66 may run on BMC 28. For instance, when encryption module 66 receives an application hash, it queries a local security database 68 stored in association with BMC 28 to determine if the application hash matches that of devices approved to access BMC 28. As another example, when encryption module 68 receives a user credential hash from an NFC communication, it retrieves a private key from local storage database 68 to decrypt the user name and password, and then sends the user name and password to BMC 28 so that BMC 28 can determine privileges for the user name and password as if they were sent through normal out-of-band communications. Microcontroller 60 thus adapts BMC 28 so that NFC interacts with BMC 28 as if the NFC were retrieved from a network that is the normal source of BMC interactions. In one embodiment, a lock manager 70 executing on BMC 28 to actuate electromechanical locks may instead run on microcontroller 60. In some embodiments, microcontroller 60 directly controls electrical and/or mechanical devices, such as locks, alarms, LEDs, power of a chassis, notification to administrators, etc. . . . . Although FIG. 2 depicts an intermediary microcontroller 60, alternative embodiments may have all or some of the functions described for microcontroller 60 performed instead by BMC 28, such as an alternative embodiment in which an intermediary device is not included.

Figure 3:
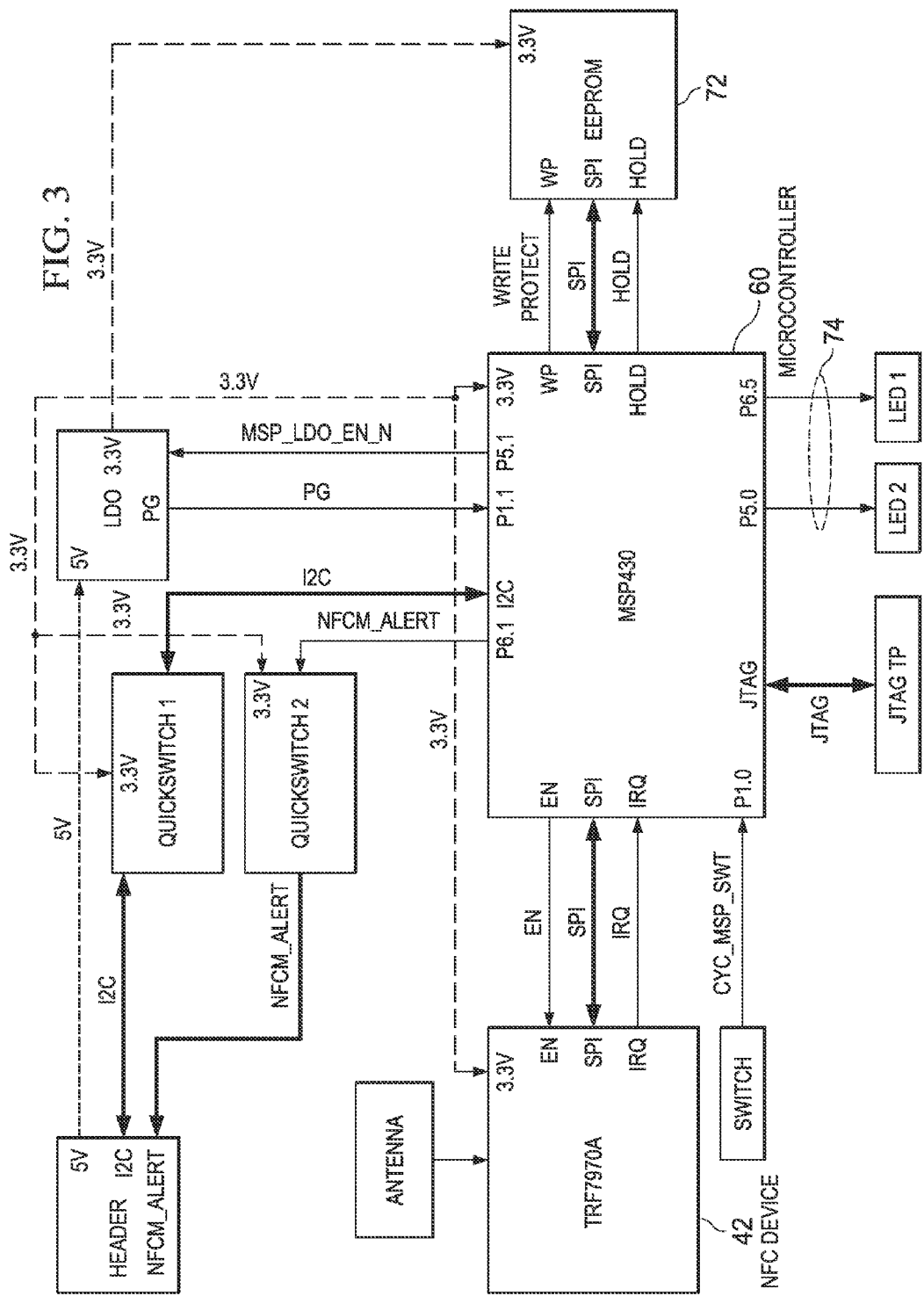
FIG. 3 depicts a circuit block diagram of an NFC intermediary device to secure NFC management of server information handling systems.

Referring now to FIG. 3, a circuit block diagram depicts an NFC intermediary device 60 to secure NFC management of server information handling systems. Microcontroller 60 decreases the time that an end user will spend in transmitting NFC from an external device to a server since microcontroller 60 acts as a smart caching device that stores communications in flash memory 72 until BMC 28 is prepared to accept the information. NFC transfers sometimes interfere with BMC communications, so microcontroller 60 manages interactions with NFC device 42 to complete tasks, such as security tasks, and saves information in flash memory 72 or other types of memory. For example, microcontroller 60 caches information coming from an external NFC device to reduce the number or interruptions that BMC 28 has during NFC communications. Microcontroller 60 pre-populates itself with external NFC communications, such as information commonly requested from BMC 28 by external devices, so that responses to external NFC requests are performed without needing to interrupt BMC 28 to request information. An alert to CPLD 62 lets BMC 28 know that the information is needed to respond to an external communication or that a new communication from an external NFC device is available. As one example, microcontroller 60 can retrieve a firmware re-flash from NFC device 42 and cache the update so that an end user need not wait for BMC 28 to complete the re-flash before completing the NFC update transfer. LEDs 74 provide the end user with a visual indication of completion of an NFC transfer and completion of an NFC task.

Figure 4:
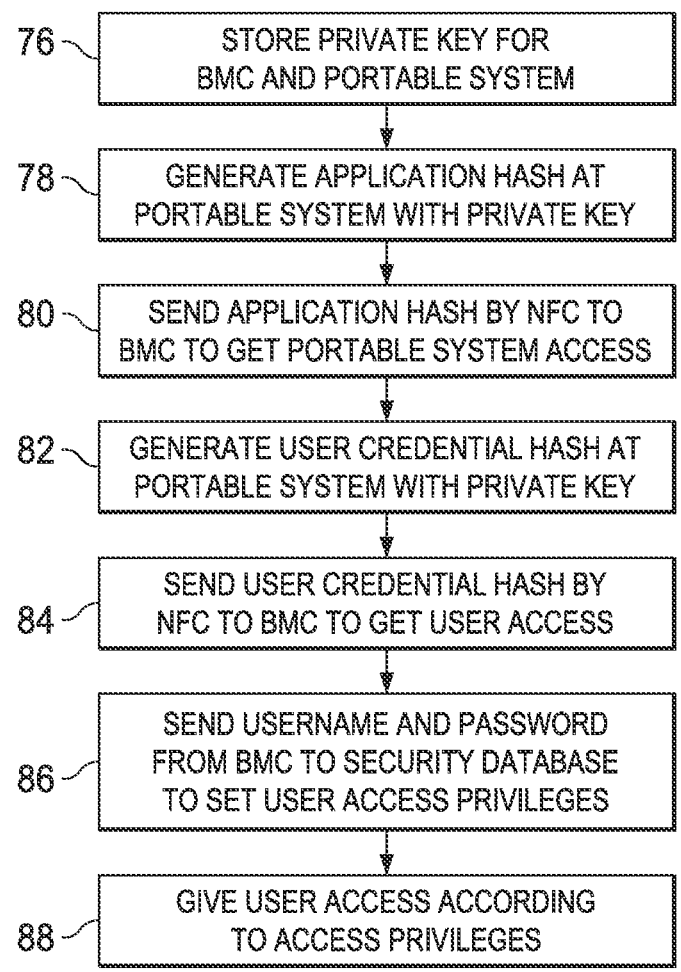
FIG. 4 depicts a flow diagram of a process for secure NFC server management.

Referring now to FIG. 4, a flow diagram depicts a process for secure NFC server management. The process uses a secure mobile platform application to communicate over NFC with an authenticated mobile device and user to interact with a server BMC, such as based upon lightweight directory access protocol (LDAP), active directory (AD), or a local BMC security database or other protocol used to verify a user. The process starts at step 76 by storing a private key in association with a BMC and a portable information handling system, such as a smartphone. For example, an administrator logs into a BMC to grant a user access via LDAP, AD or local account security controls and assigns privileges accordingly, such as the administrator does for regular network security. The administrator assigns a private key to the user at the BMC and saves the private key to the BMC. The private key can be user and BMC specific or can apply to plural users and BMCs. The end user is provided with the private key and an application download for the end user's smartphone so that the end user can input the private key, user name and password needed for BMC access.

At step 78, the application on the end user's smartphone applies the private key and application information to generate an application hash. In one embodiment, different types of applications are provided to different enterprises in a cloud data center so that the private key will create an enterprise specific application hash. At step 80, the application hash is sent by NFC from the end user's smartphone to the NFC associated with the server BMC. If the application hash does not match an expected application hash stored in association with the BMC, then the application is not authenticated so that no other NFC transfers are permitted. If the application hash matches, the process continues to step 82 to generate a user credential hash by applying the private key to the end user's user name and password. Once the application hash and the user credential hash are created, the application deletes the user name, password and private key in order to enhance security. At step 84 the user credential hash is sent by NFC transfer to the BMC, where it is decrypted by reference to the private key. At step 86, the BMC confirms the access privileges of the user name and password with the security database, such as by retrieving LDAP privileges associated with the user name and password. At step 88, the end user is provided with BMC access as defined by the retrieved privileges. In one embodiment, the application presents the access privileges available to an end user, such as by grey out disallowed accesses.

Figure 5:
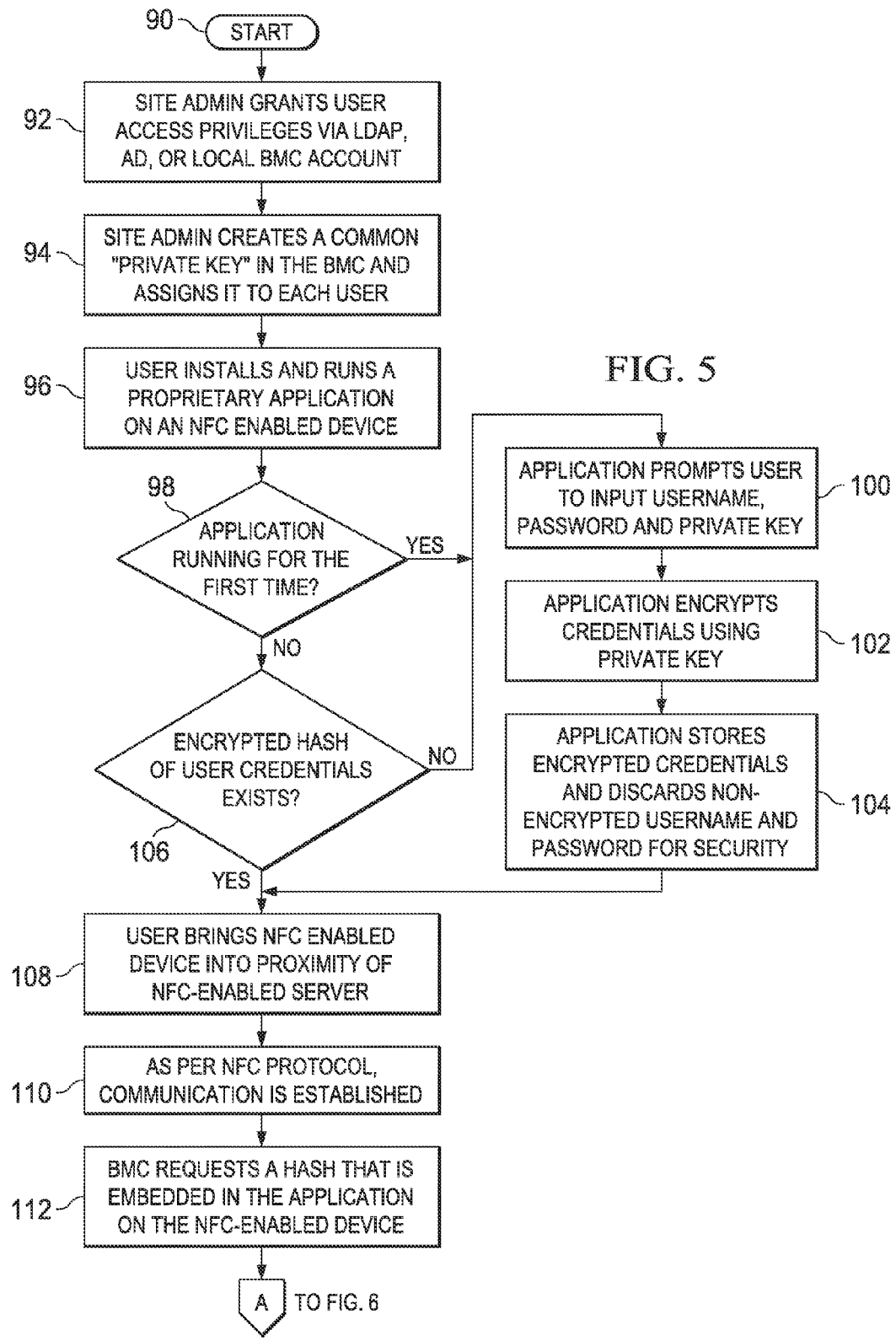
FIG. 5 depicts a flow diagram of a process for enabling a portable information handling system to support secure NFC management of a server information handling system.

Referring now to FIG. 5, a flow diagram depicts a process for enabling a portable information handling system to support secure NFC management of a server information handling system. The process starts at step 90 and at step 92 a site administrator grants user access privileges through a site security database, such as LDAP, AD or local BMC security accounts. At step 94, the site administrator creates a common private key in the BMC and assigns it to each authorized user. At step 96, the user installs and runs a proprietary application on an NFC enable device, such as a smartphone. At step 98, a determination is made of whether the application is running for the first time. If so, the process continues to step 100 where the application prompts the user to input a user name, password and private key. At step 102, the application encrypts the user name and password credentials using the private key. At step 104, the application stores encrypted credential, such as with an application hash of an application identifier encrypted with the private key and a user credential hash of the user name and password encrypted with the private key. If at step 98 the application has already run, the process continues to step 106 to determine if an encrypted hash of the application and user credentials exists. If not, the process returns to step 100 to create the encrypted application and user credentials. If the credentials exist, the process continues to step 108 to perform an NFC transfer from the application and NFC device to the NFC enabled BMC. At step 110, NFC protocol communication is established and, at step 112, the BMC requests the security credential hash that is embedded in the NFC enabled device. The process then continues to entry point B of FIG. 6.

Figure 6:
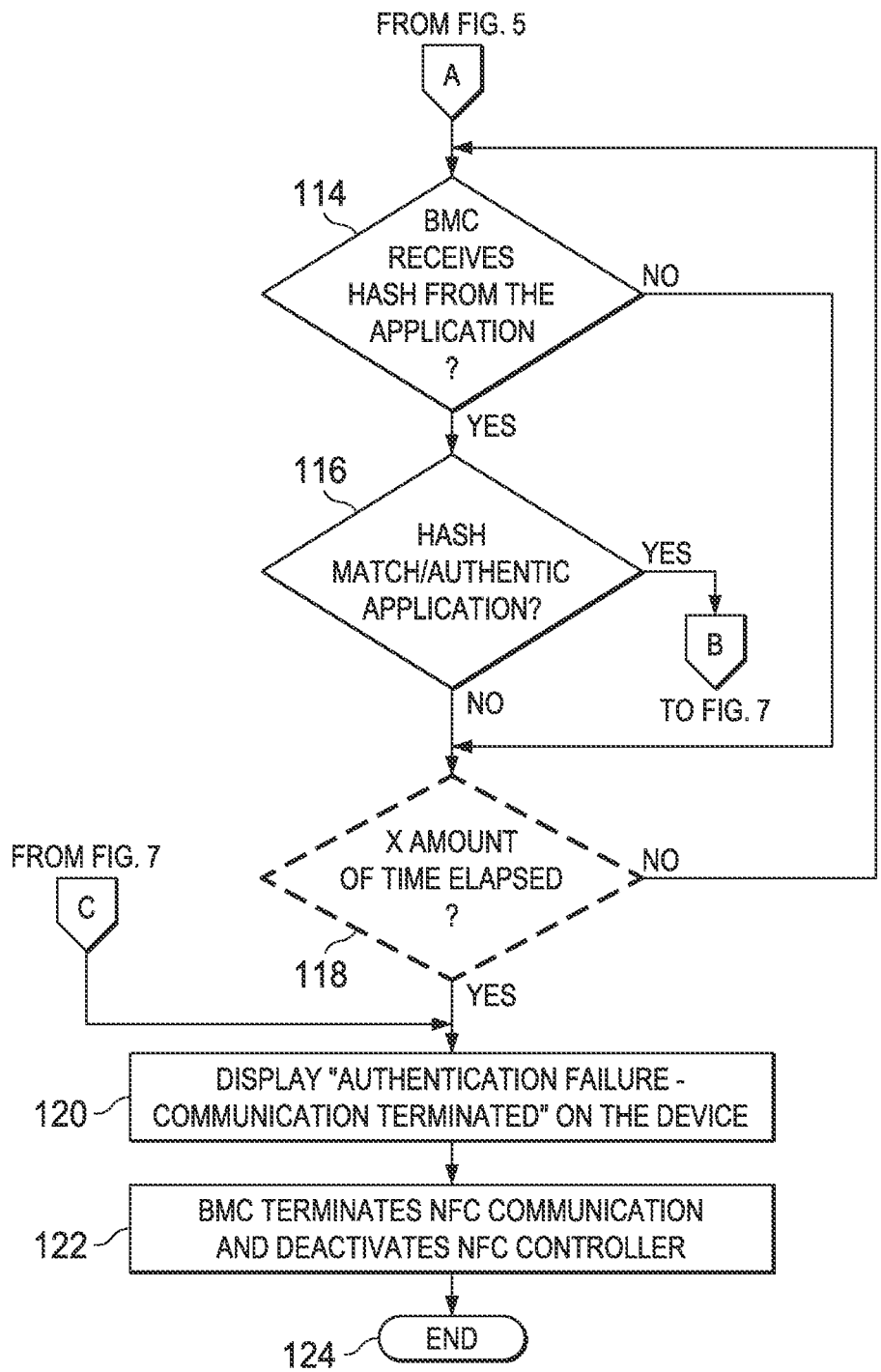
FIG. 6 depicts a flow diagram of a process for validating a portable information handling system to engage in secure NFC management of a server information handling system.

Referring now to FIG. 6, a flow diagram depicts a process for validating a portable information handling system to engage in secure NFC management of a server information handling system. The process starts at step 114 with receipt by the BMC of the security credential hash from an NFC transfer of the application. In this example embodiment, the application hash is sent first and its authentication is required before the user credential hash is accepted by the BMC. In alternative embodiments, both the application hash and user credential hash are sent together and then considered in sequence. If the BMC does not receive the application hash, the process continues to step 118 to determine if a timer has expired. If at step 114 the BMC received the hash, the process continues to step 116 where the BMC determines whether the application hash is authentic. If so, the process continues to entry point C in FIG. 7. If not, the process continues to step 118 to determine if a timer has expired. If at step 118, the timer has not expired, the process returns to step 114. If at step 118, the timer has expired, the process continues to step 120 to display at the device that an authentication failure has occurred. At step 122, the BMC terminates the NFC interface and deactivates the NFC controller to prevent further attempts at unauthorized access.

Figure 7:
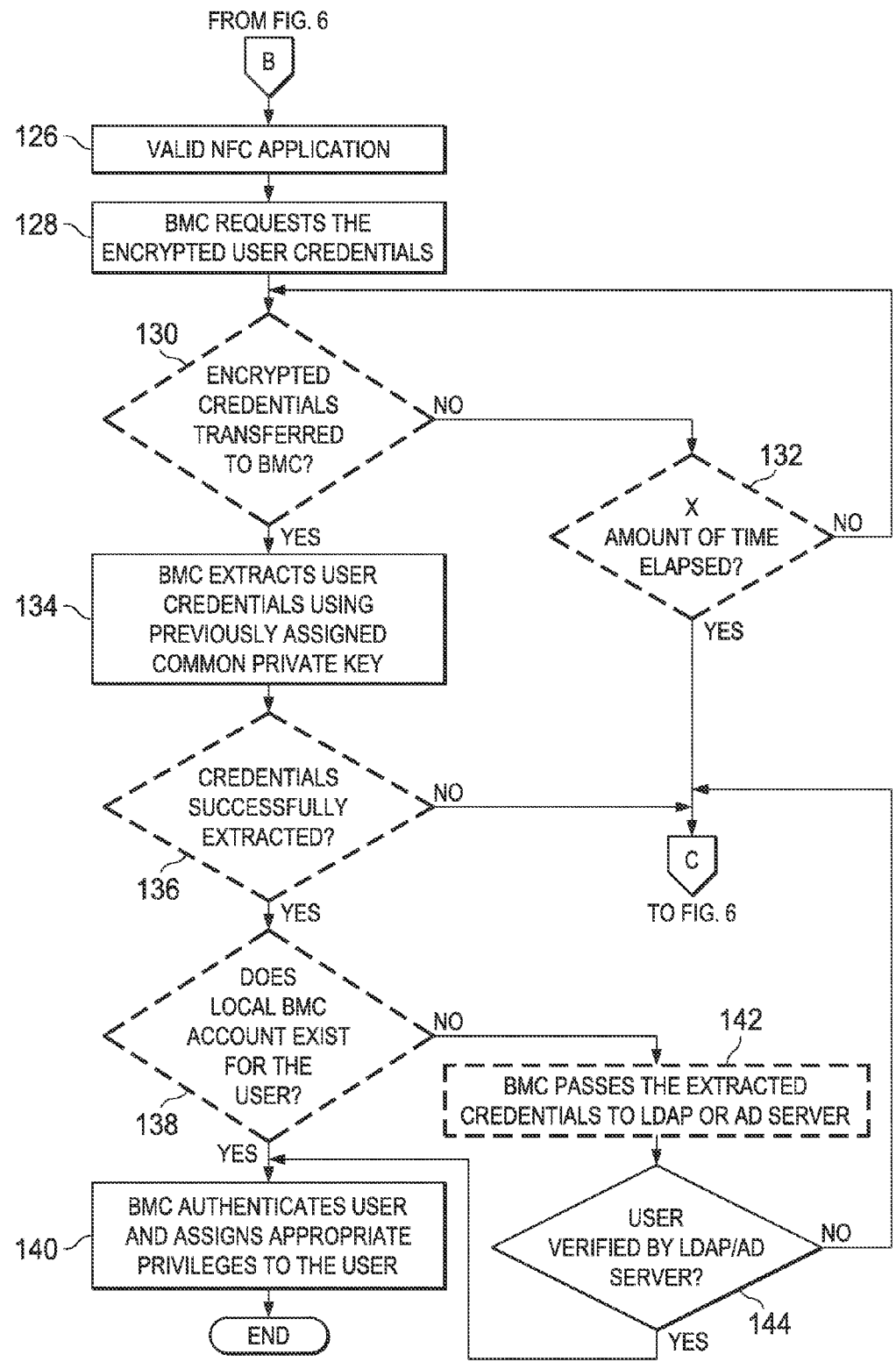
FIG. 7 depicts a flow diagram of a process for establishing access privileges of a portable information handling system NFC management of a server information handling system.

Referring now to FIG. 7, a flow diagram depicts a process for establishing access privileges of a portable information handling system NFC management of a server information handling system. From entry point C, the process continues at step 126 by determining that the application is authorized to access the BMC. At step 128, the BMC requests an NFC transfer of the user credential hash from the application. At step 130 a determination is made of whether the encrypted credentials are transferred to the BMC. If not, the process continues to step 132 to determine if a timer has expired and, if so, the process returns to entry point D to terminate NFC transfers. If at step 130 the encrypted credentials are transferred to the BMC, the process continues to step 134 for the BMC to extract the user credentials using the private key. At step 136 a determination is made of whether the credentials were successfully extracted and, if not the process returns to entry point D to terminate. If credentials are successfully extracted at step 136, the process continues to step 138 to determine if security account information is stored locally at the BMC. If so, the process continues to step 140 for the BMC authenticate the user and assign appropriate privileges based upon local privileges and the process ends. If at step 138 local security account information is not maintained, the process continues to step 142 for the BMC to obtain security credentials from a network security database. At step 144, if the user is verified, the process continues to step 140, and if the user is not verified, the process terminates at entry point D.

Figure 8A:
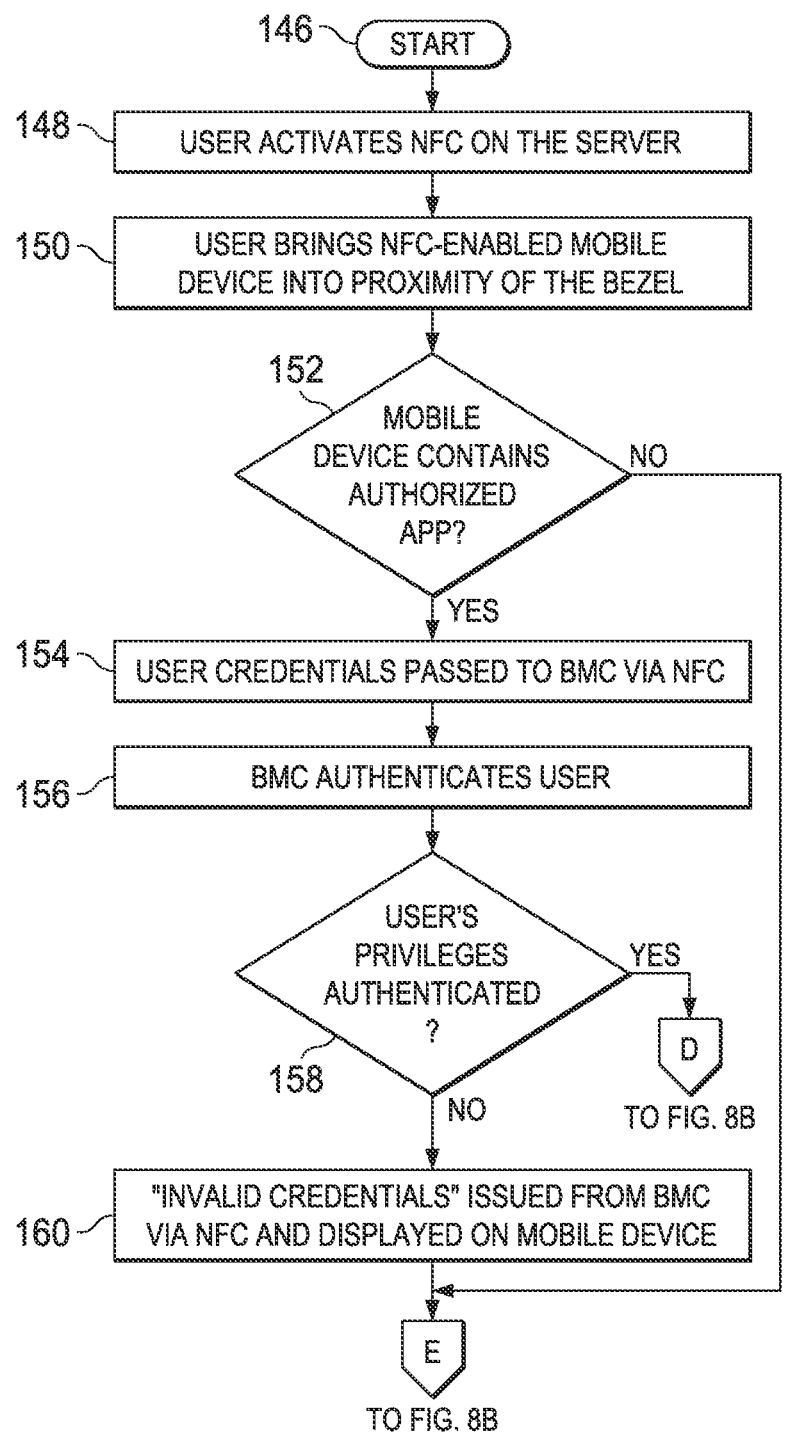
FIGS. 8A-8B depict a flow diagram of secure NFC management of physical access to server information handling system components based upon access privileges and automated lock activation.
Figure 8B:
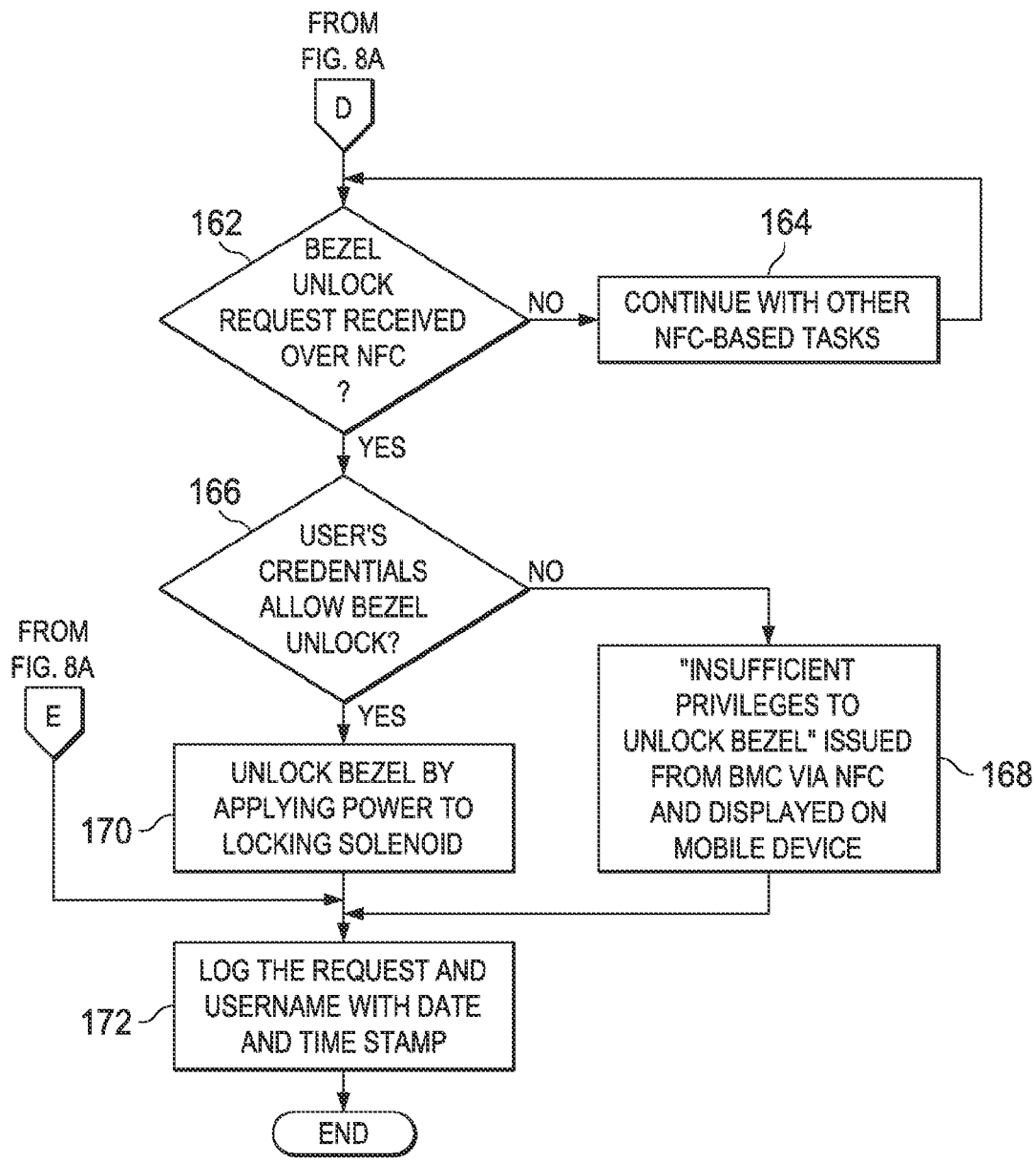

Referring now to FIG. 8, a flow diagram depicts secure NFC management of physical access to server information handling system components based upon access privileges and automated lock activation. The process starts at step 146 and continues to step 148 for activation of NFC transfers between a mobile application and a server BMC, such as set forth above. At step 150, the user brings a mobile NFC device into proximity of a server bezel having BMC-based server security. At step 152, a determination is made of whether the mobile application is an authorized application and, if not, the process terminates at step 172. If the mobile application is authorized at step 152, the process continues to step 154 to pass the user credentials to the BMC through an NFC transfer. At step 156 the BMC authenticates the user with the user credentials. At step 158, the BMC determines whether the user's privileges are authentic and, if not, at step 160 a message is presented that authentication failed and the process terminates at step 172. If at step 158 the users privileges are authentic, the process continues to step 162 to determine if a bezel unlock request was received over an NFC transfer. If not, the process continues to step 164 to perform other NFC based tasks. If at step 162 a bezel unlock request was received, the process continues to step 166 to determine if the user has privileges for unlocking of the bezel. If no, the process continues to step 168 to present a message that bezel unlock privileges are not available and then to terminate at step 172. If the user has bezel unlock privileges, the process continues to step 170 for the BMC to command power to a locking solenoid so that the bezel is unlocked. At step 172 the unlock request and result is logged with the user name and a date stamp.

Although the present invention has been described in detail, it should be understood that various changes, substitutions and alterations can be made hereto without departing from the spirit and scope of the invention as defined by the appended claims.

What is claimed is:

1. A method for secure near field communication (NFC) with a server information handling system, the method comprising:

storing a private key at a baseboard management controller (BMC) of the server information handling system, the private key stored in association with plural predetermined end users, the baseboard management controller performing management functions for the server information handling system including access to management configurations of the server information handling system;

inputting the private key to an NFC application executing on a portable information handling system, the portable information handling system having an NFC device;

applying the private key with the NFC application to generate an NFC application hash;

inputting a user name and password of one of the predetermined end users to the NFC application;

applying the private key with the NFC application to generate a user credential hash;

communicating the NFC application hash and user credential hash with the NFC application and portable information handling system NFC device through an NFC communication to the baseboard management controller; and authorizing access by the one of the predetermined end users to interact with the server information handling system management configurations through the baseboard management controller in response to the communicating;

wherein the NFC application hash authenticates the NFC application to the baseboard management controller, the baseboard management controller requiring the NFC application authentication before applying the user credential hash; and wherein the user credential hash authenticates the one of the predetermined users to the baseboard management controller.

2. The method of claim 1 wherein authorizing access by the one of the plural predetermined end users in response to the communicating further comprises:
applying the private key to generate a server hash with the baseboard management controller; and
comparing the NFC application hash and the server hash;
authorizing communication by the NFC device of the user credential hash if the NFC application hash matches the server hash; and
declining communication by the NFC device of the user credential hash if the NFC application hash fails to match the server hash.

3. The method of claim 2 wherein authorizing access by the one of the predetermined end users in response to the communicating further comprises:
communicating the user credential hash with the NFC device to the baseboard management controller;
applying the private key with the baseboard management controller to extract the user name and password of the predetermined end user from the user credential hash; and
authorizing access if the user name and password match an authorized user name and password.

4. The method of claim 3 wherein authorizing access if the user name and password match an authorized user name and password further comprises:
looking up the user name and password with the BMC at an active directory security database; and
authorizing access by NFC communications at an access level indicated by the active directory security database.

5. The method of claim 3 wherein authorizing access if the user name and password match an authorized user name and password further comprises:
looking up the user name and password with the BMC at an LDAP security database; and
authorizing access by NFC communications at an access level indicated by the LDAP security database.

6. The method of claim 3 wherein authorizing access if the user name and password match an authorized user name and password further comprises:
looking up the user name and password with the BMC at a local security table; and
authorizing access by NFC communications at an access level indicated by the local security table.

7. The method of claim 1 wherein the private key authorizes only NFC communication at one server information handling system.

8. The method of claim 1 wherein authorizing access by the predetermined end user in response to the communicating further comprises:
applying the private key to decrypt the user credential hash at a microcontroller associated with an NFC device disposed proximate the baseboard management controller;
sending the user name and password of the decrypted user credential hash from the microcontroller to the baseboard management controller; and
determining authorization of the user name and password with the baseboard management controller.

9. The method of claim 1 wherein authorizing access by the predetermined end user in response to the communicating further comprises automatically releasing a lock engaged at the server information handling system.

10. The method of claim 9 wherein the lock secures a storage device to the server information handling system.

11. A server information handling system comprising:
a chassis;
one or more processors disposed in the chassis and operable to process information;
memory disposed in the chassis and interfaced with the processors, the memory operable to store the information;
one or more network devices disposed in the chassis and interfaced with the processor, the one or more network devices operable to communicate with one or more networks;
a baseboard management controller (BMC) disposed in the chassis and interfaced with the one or more processors, the memory and the one or more network devices, the baseboard management controller operable to manage operation of the one or more processors;
an NFC device interfaced with the baseboard management controller and operable to exchange NFC communications with an external NFC device;
an encryption module, stored in the memory, interfaced with the NFC device and operable to apply a private key to restrict NFC communications to external NFC devices that have the private key, the private key associated with plural authorized end users, the encryption module requiring authentication of an application running on the external NFC device before accepting other NFC communications from the external device, the encryption module generating an NFC application hash with the private key and authenticating the external NFC devices if the external NFC devices provide the NFC application hash; and
an LDAP module, stored in the memory, operable to accept a user name and password decrypted by the encryption module from an NFC communication encrypted with the private key, and to apply the user name and password to a security database that defines an access level associated with the user name, the access level defining plural access levels, at least one of the access levels restricting at least some BMC functions available to an end user, the LDAP module requiring authentication of the user name and password before providing BMC functions to the end user.

12. The server information handling system of claim 11 wherein the encryption module comprises firmware instructions stored in flash memory of the baseboard management controller.

13. The server information handling system of claim 11 further comprising a microcontroller disposed between the NFC device and the baseboard management controller, wherein the encryption module comprises firmware instructions stored in flash memory of the baseboard management controller.

14. The server information handling system of claim 11 further comprising a chassis lock interfaced with the microcontroller, the microcontroller operable to unlock the chassis lock if the user name has an access level associated with access to the chassis.

15. The server information handling system of claim 11 further comprising a memory lock interfaced with the microcontroller, the microcontroller operable to unlock the memory lock if the user name has an access level associated with access to the memory.

16. A security system for providing secure access to a server information handling system with NFC communication, the security system comprising:

a security database storing plural user names, each user name having a password and one or more access privileges;

a baseboard management controller (BMC) integrated with the server information handling system and operable to manage operations of the server information handling system including configuration of the server information handling system to respond to client information handling systems through a network;

an NFC device integrated with the server information handling system and interfaced with the baseboard management controller, the NFC device operable to provide NFC communications to the baseboard management controller; and an NFC application stored in memory of a portable information handling system and operable to apply a private key to create an NFC application hash and a user credential hash, the NFC application hash authenticating the NFC application for use by selected one of the plural user names;

wherein the baseboard management controller accepts NFC communications only from NFC applications authenticated by the NFC application hash at the server information handling system and provides NFC applications access at a privilege level retrieved from the security database based upon a user name and password provided from the NFC application and encrypted by the private key.

17. The security system of claim 16 wherein the private key only provides access by NFC communications.

18. The security system of claim 16 further comprising a microcontroller disposed between the NFC device and the baseboard management controller, the microcontroller operable to buffer information communicated between the baseboard management controller and the NFC device.

19. The security system of claim 18 further comprising a lock interfaced with the microcontroller, the lock restricting physical access to the server information handling system, the microcontroller operable to unlock the lock if the user name has a privilege level for physical access to the server information handling system.

* * * * *